(12) United States Patent
Spielman

(10) Patent No.: US 7,036,640 B2
(45) Date of Patent: May 2, 2006

(54) BRAKE COOLING SYSTEM AND METHOD OF COOLING BRAKES IN AN AXLE ASSEMBLY

(75) Inventor: Harold W Spielman, Abbottsford (CA)

(73) Assignee: Towhaul Corporation, Bozeman, MT (US)

( * ) Notice: Subject to any disclaimer, the term of this patent is extended or adjusted under 35 U.S.C. 154(b) by 0 days.

(21) Appl. No.: 10/706,982

(22) Filed: Nov. 14, 2003

(65) Prior Publication Data

US 2004/0129514 A1 Jul. 8, 2004

Related U.S. Application Data

(60) Provisional application No. 60/426,486, filed on Nov. 15, 2002.

(51) Int. Cl.
*F16D 65/78* (2006.01)

(52) U.S. Cl. .............................. 188/264 P; 188/264 D; 188/264 CC

(58) Field of Classification Search ......... 188/264 CC, 188/264 D, 264 F, 264 P, 264 R, 264 E See application file for complete search history.

(56) References Cited

U.S. PATENT DOCUMENTS

| | | | | |
|---|---|---|---|---|
| 2,873,826 A | * | 2/1959 | Werner | 188/264 E |
| 2,879,867 A | * | 3/1959 | Rike | 188/264 F |
| 2,928,511 A | * | 3/1960 | Helvern et al. | 188/264 E |
| 2,934,177 A | * | 4/1960 | Burnette et al. | 188/264 E |
| 2,971,612 A | * | 2/1961 | Graber | 188/264 P |
| 3,586,134 A | * | 6/1971 | Westfall | 188/264 P |
| 3,949,844 A | * | 4/1976 | Larson et al. | 188/264 P |
| 4,083,469 A | * | 4/1978 | Schexnayder | 188/264 P |
| 4,491,202 A | * | 1/1985 | Schmitt | 188/71.5 |
| 4,736,821 A | * | 4/1988 | Ries | 188/264 P |
| 5,178,238 A | * | 1/1993 | Schaeff | 188/295 |
| 5,190,123 A | | 3/1993 | Hvolka | |
| 6,030,314 A | * | 2/2000 | Brooks et al. | 303/191 |
| 6,135,065 A | | 10/2000 | Weathers et al. | |
| 6,296,087 B1 | | 10/2001 | Bissonnette et al. | 188/264 F |
| 2003/0188933 A1 | * | 10/2003 | Johnson et al. | 188/71.6 |

* cited by examiner

*Primary Examiner*—Thomas Williams
(74) *Attorney, Agent, or Firm*—Clark & Brody

(57) ABSTRACT

An axle assembly that uses brakes that require cooling includes a brake cooling system that uses at least one hydraulic pump that supplies cooling oil to the brakes. Means for driving of the hydraulic pump using rotation of a component of the axle assembly such as a transmission or other mechanism is provided, thereby eliminating reliance on a towing vehicle. A heat exchanger cools the heated oil exiting from the brakes and recirculates the cooled oil back to the brakes for continued cooling.

20 Claims, 2 Drawing Sheets

BRAKE COOLING SYSTEM AND METHOD OF COOLING BRAKES IN AN AXLE ASSEMBLY

This application claims priority under 35 USC 119(e) based on application Ser. No. 60/426,486 filed on Nov. 15, 2002.

FIELD OF THE INVENTION

The present invention is directed to a brake cooling system, and, in particular, to a system that uses a transmission of the axle assembly to drive the cooling system.

BACKGROUND ART

In heavy duty mining or construction machinery, a number of different types of brake cooling systems for brakes in a vehicle axle assembly are often utilized. Some systems use the engine or power unit of the vehicle for brake cooling whereas others may use air to oil coolers or circulate a cooler fluid through the oil at the axle assembly itself.

Another need for brake cooling systems is found in trailers designed to haul heavy duty mining equipment such as shovels and mine haulage trailers, e.g., bottom dump trailers, and the like. FIG. 1 shows a typical lowboy trailer 90 having a trailer bed 91 for supporting heavy machinery 92, a gooseneck 93, a hauling vehicle 95, trailer wheels 97 (one shown), and a trailer axle assembly represented by numeral 99. The assembly 99 includes an axle with brakes (both not shown) for trailer operation, wherein the brakes are controlled by the operator in the hauling vehicle 95 that attaches to the trailer via the gooseneck 93. See also U.S. Pat. No. 6,113,338 to Smith (incorporated in its entirety herein).

One problem that has arisen for cooling trailer brakes is caused by the increase use of a removable gooseneck hitch for the trailers, as disclosed in U.S. Pat. No. 5,435,586 to Smith, also incorporated in its entirety by reference, and depicted in FIG. 1. These types of hitches permit the trailer size to increase, thus allowing for heavier trailer loads. However, because of the increased loading, substantially higher braking requirements are imposed on the trailer brakes, and existing braking cooling systems are ill-equipped for such demands. Secondly, the use of trailers that rely on connection to a gooseneck hitch as disclosed in the '586 Smith patent creates problems when relying on the power unit of the vehicle hauling the trailer for trailer brake cooling. The connection between the hauling vehicle and cooling system must be made every time the trailer is hooked to the hitch, and larger hoses, couplings, etc. are required due to the increased braking requirements of the trailer.

Therefore, a need exists to develop better brake cooling systems, particularly in instances where the power unit of the vehicle must be used for brake cooling. While one solution would be to install a separate engine on the trailer itself for brake cooling, but such an engine requires fuel, oil, and maintenance. In addition, failure of the engine could compromise the braking ability of the trailer axles, and create a potentially dangerous situation if trailer braking is lost.

One brake cooling system is disclosed in U.S. Pat. No. 6,296,087 to Bissonnette et al. While this system uses the rotation of the axle to move the cooling fluid, this system lacks the cooling capacity needed for heavy duty applications. Moreover, the system requires the axle assembly to be modified to include the cooling fluid pumping mechanism, thus complicating the axle assembly manufacture.

The present invention overcomes these drawbacks by the creation of a system that relies on the axle rotation for braking cooling, eliminates the need for an additional engine, permits the use of conventional axle/transmission assemblies, and satisfies the need to obtain increased cooling capacity for large trailers.

SUMMARY OF THE INVENTION

It is a first object of the present invention to provide an improved brake cooling system.

Another object of the invention is to provide a brake cooling system that is self-reliant and does not rely on a hauling vehicle cooling system, or a separate trailer-mounted engine driven cooling system.

A further object is a method of cooling the brakes of an axle assembly that relies on the axle transmission as the primary driver for the cooling system.

One other object of the invention is the application of a brake cooling system for a trailer axle, particularly, a heavy duty trailer, such as a lowboy trailer, with a hitch that accommodates a gooseneck hitch found on a towing vehicle.

In satisfaction of the foregoing objects and advantages, the present invention offers a number of improvements in the field of brake cooling systems. In one aspect, the invention is directed to a brake cooling system that includes an air-oil cooler assembly and at least one hydraulic pump. An output of the pump is in communication with an inlet of the air-oil cooler assembly, wherein at least a portion of the oil exiting an outlet of the air-oil cooler assembly is adapted to cool the brakes of the axle assembly. A hydraulic fan assembly is provided to circulate air past the air-oil cooler assembly, a fan of the fan assembly being driven by oil exiting the outlet of the air-oil cooler assembly. Oil from the hydraulic fan and brakes is received by a reservoir for further recirculation to an inlet of the at least one hydraulic pump. A pump drive is provided that is linked to a transmission of the axle assembly, output of the transmission driving the at least one hydraulic pump.

The hydraulic fan assembly can include a control valve downstream of the air-oil assembly to receive a portion of the oil exiting an outlet of the air-oil cooler assembly, with the valve adapted to control the flow of oil to the hydraulic fan assembly for fan operation. An electric or mechanical clutch can be provided to link the transmission to the pump drive, the clutch controlling driving of the pump drive by the transmission based on the direction of rotation of a shaft of the axle assembly. The clutch can be disengaged by using a signal representing operation of backup lights on the trailer. Alternatively, the transmission can be controlled electronically without the need for a clutch.

A temperature regulated bypass valve can be provided that is in communication with an outlet of the air-oil cooler assembly, the bypass valve controlling flow of oil to the hydraulic fan assembly based on a sensed temperature of the oil. A divider downstream of the air-oil cooler assembly can be used to direct oil to the brakes of the axle assembly and the hydraulic fan assembly. A manifold collector can also be provided to receive oil from the brakes and the hydraulic fan assembly for return to the reservoir.

A pair of hydraulic pumps could be used with the output of the pumps being split between a pair of brake cooling inlets on the axle assembly.

The invention also entails a method of cooling brakes in an axle assembly. One mode of the method includes providing at least one hydraulic pump and driving the at least one hydraulic pump using a rotation of the shaft of the axle assembly. Oil exiting the at least one hydraulic pump is directed to an air-oil cooler assembly to reduce the temperature of the oil. A portion of the cooled oil exiting the air-oil cooler assembly is directed to brakes of the axle assembly with another portion of the oil exiting the air cooler assembly being directed to a hydraulic fan assembly to drive a hydraulic fan thereof and circulate air across the air-oil cooler assembly. Oil that exits the brakes and fan assembly is accumulated in a reservoir for recirculation to the hydraulic pump.

The pump can be driven by a transmission linked to the axle assembly, and can be deactivated if the wheels of the axle assembly rotate in a direction opposite to that used to drive the pump. Linking of the pump to the transmission can be direct or via a mechanical or electrical clutch mechanism.

The temperature of the oil being pumped can be monitored and if the temperature increases beyond a certain temperature, additional oil is pumped to the hydraulic fan to increase oil cooling.

The invention is particularly adapted for use in trailers that use axle assemblies for support of the rear of the trailer, and require braking assemblies for the rear wheels of the trailer. Preferred trailers are lowboy trailers that use a gooseneck hitch to lift a front end of the trailer for trailer movement.

BRIEF DESCRIPTION OF THE DRAWINGS

Reference is now made to the drawings of the invention wherein.

DESCRIPTION OF THE PREFERRED EMBODIMENTS

The present invention offers significant advantages in the field of heavy machinery that requires extensive braking due to the movement of heavy loads. Instead of requiring an additional engine for braking or complicated brake cooling systems, the present invention supplies a cooling fluid to the brakes of an axle assembly via the use of a system that relies on the axle components themselves for powering of the system.

Figure 1:
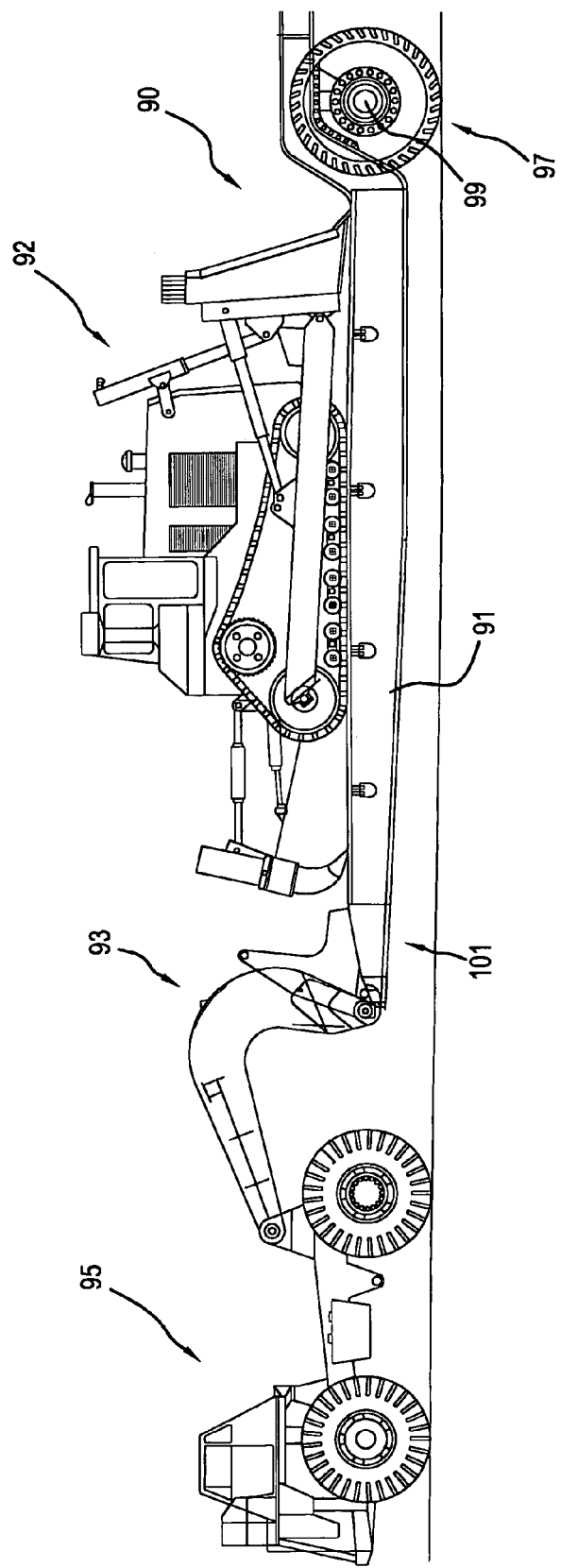
FIG. 1 shows a typical prior art trailer that includes a braking system.
Figure 2:
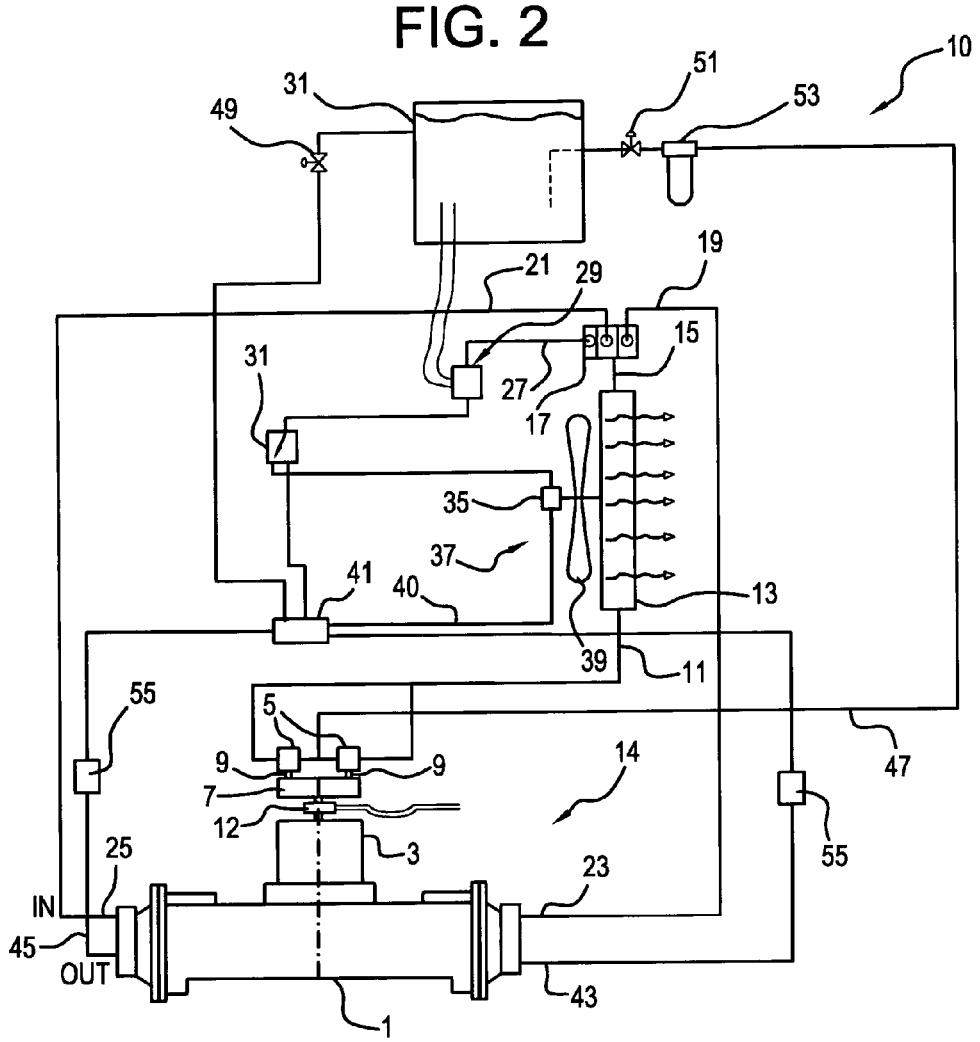
FIG. 2 is a schematic drawing of one embodiment of the invention.

Referring now to FIG. 2, one embodiment of the inventive system is designated by the reference numeral 10. The system as shown is adapted for cooling of the brakes found in a Caterpillar 785 axle assembly 1 containing a transmission 3. While not shown, the axle/transmission assembly would be mounted on a trailer and would support trailer tires.

The system 10 employs a pair of hydraulic piston pumps 5, which are driven by a gear box drive 7, having two output shafts 9, each driving respective pumps 5.

The gear box drive 7 is powered by an output shaft (not shown) of the transmission 3, wherein the transmission 3 is locked in its fourth gear. It has been found that the output of fourth gear of the transmission for the Caterpillar 785 axle assembly provides the proper output shaft rotation to power the gear drive box 7 for pump operation as explained in greater detail below.

The transmission 3 can be disengaged from the gear box drive 7 via the electrically operable clutch 12. The clutch 12 is powered via a connection 14 to the back-up lights of a vehicle such as a trailer using the axle assembly 1. When the trailer or other vehicle employing the axle assembly is in reverse, and the back-up lights are operating, the electric clutch 12 is powered to disengage the transmission 3 from the gear box drive 7. In this way, the reverse rotation of the shaft of the axle assembly 1 is not imparted to the gear drive box 7 and pumps 5. Of course, other indicating means that the axle shaft is intending to reverse rotation could be employed to ensure that the gear drive box is disengaged so that the pumps are not operated in reverse, e.g., sensors on the shaft, or the like.

Figure 3:
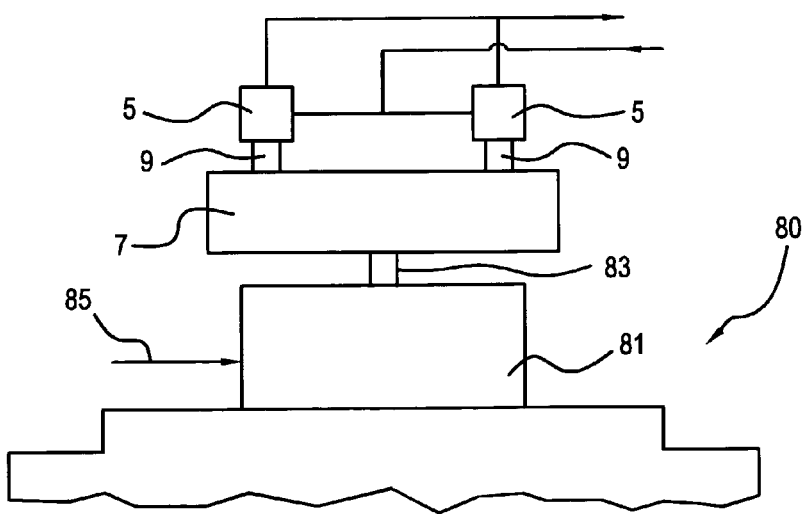
FIG. 3 shows an alternative embodiment of the invention.

While an electric clutch 12 is shown as a means for disengaging the transmission 3 from the gear box drive 7, it may be possible to eliminate the clutch if the gears of the transmission being employed with a given axle assembly can be engaged or disengaged electrically. Referring to FIG. 3, an axle assembly 80 with transmission 81 is shown wherein the transmission output 83 is directly linked to the gear drive box 7. The assembly 80 has an electronically actuated transmission such that sending a signal 85 to the transmission itself from the back-up lights, or other indicator of reverse operation, can disengage the selected gear that is intended for pump driving. While a fourth gear is shown for the Caterpillar 785 axle assembly, another gear may be appropriate for a different axle assembly/transmission combination. While it is preferred to have the electrically actuated clutch 12 as a system component when dealing with heavy duty trailers, other applications may allow the use of a mechanically actuated clutch.

The pumps 5 are selected to produce a generally constant output at a target speed of the trailer. The system 10 preferably employs a pump output of 150 gallons per minute based on a rotation of the axle shaft equating to a trailer speed of 5.5 mile per hour at maximum load. Generally, the top speed of a heavy equipment trailer such as disclosed in the Smith patents is around 5 MPH. Thus, the pumps 5 need only be sized so that the desired output is achieved at the trailer speed of 5.5 MPH. There is no need for an increase in output based on an increase in trailer speed since the trailer maximum speed is generally only 5 MPH. Therefore, constant volume hydraulic piston pumps, axial or radial, can be used, since only a desired output at the 5.5 MPH target speed is necessary the required cooling of the brakes of the axle assembly.

The output 11 of the pumps 5 enters the air-oil cooler assembly 13. The assembly 13 is a conventional air-oil cooler wherein the oil is directed through a serpentine path via tubing, the tubing separated by fin stock for heat exchange. Once the oil completes its path of travel through the air-oil cooler assembly, and exits at outlet 15, the oil is directed to a gear flow divider 17. This divider splits the oil into two primary flow paths 19 and 21, each directed to the brake cooling inlets, 23 and 25, respectively. The cooling system of the invention as described is capable of providing around 500 HP of cooling for the trailer brakes. Of course, depending on the application, different degrees of cooling capacity can be selected based on design considerations such as vehicle or trailer size, brake cooling requirements, etc.

A third output 27 is directed to a thermal by-pass valve 29. This valve is temperature regulated based on the temperature of the oil in the reservoir 31. If the oil is at a certain temperature, e.g., 100° F., the valve opens, and oil passes to the adjustable control valve 33. This valve directs a volume of oil, e.g., 10 GPM, to the drive 35 of the hydraulic fan assembly 37. The drive 35 rotates the fan 39 to circulate air past the air-oil cooler assembly 13 to reduce the temperature of the oil. Any conventional bypass valve, control valve, and hydraulic fan assembly can be employed to circulate air past the air-oil cooler assembly. Temperature sensing for fan assembly control could be done at other points in the system, e.g., returns from the brakes themselves, inlet to the cooler assembly, etc.

A manifold collector 41 is provided to collect the output from the fan drive 35, outlets 43 and 45 from the brakes, and the remainder of oil passing through the control valve 33 that is not directed to the fan drive 35.

The outlet of the manifold collector 41 is directed to the reservoir 31. The reservoir then acts as the source of oil for the inlet of the pump at 47. The reservoir has inlet and outlet gate valves 49 and 51. An outlet or return line filter 53 as would be typically found upstream of hydraulic pump inlets is also provided. The brake cooling inlets 23 and 25 are equipped with brake filters 55 as are conventional with the disclosed axle assembly 1.

While a pair of hydraulic piston pumps are disclosed as one type of a pump system to move the oil for cooling purposes, other types of hydraulic pumps, e.g., gear pumps, etc., that would be capable of moving the oil for heat exchange and brake cooling can be employed without departing from the intended scope of the invention. For example, in certain applications, only one pump may provide sufficient flow for cooling.

The control system for operation of the hydraulic fan assembly 37 is preferred but not necessary. That is, the fan 39 could be designed to run all the time, even though in most applications, the duty on the fan 39 will be intermittent. For example, in colder environments, merely pumping the oil through the air-oil cooler assembly 13 may provide sufficient heat exchange such that the fan 39 may not have to operate. In some situations, it may be necessary to include heaters on the reservoir to keep the oil at a certain minimum temperature for operation.

The brake cooling system can be mounted to the vehicle or trailer in any conventional manner. Moreover, the air-oil cooler assembly 13 could be positioned to face a direction of travel of the vehicle or trailer so that additional circulation of ambient across the assembly 13 occurs during vehicle or trailer movement.

While the invention is disclosed for particular application of a Caterpillar 785 axle and transmission that would find use on a heavy duty trailer, the system could be used with virtually any axle transmission combination that requires brake cooling in the axle assembly. These types of axle assemblies with or without transmissions are well known in the field of heavy duty construction and mining equipment, and a further description of the particular details of the assembly are not necessary for understanding of the invention.

Another significant advantage of the invention is the ability to use a conventional axle/transmission combination for the cooling system. There is no need for modification of the axle assembly at all, and the cost and time of installation of the system is greatly reduced. Moreover, since a stock axle assembly can be employed, there are no costs associated with axle modification.

While a transmission is disclosed as a means to use rotation of an axle shaft for powering the pumps, other mechanical couplings can be used to drive the pumps based on the rotation of the axle shaft or rotation of another axle component ultimately connected to the axle shaft.

As such, an invention has been disclosed in terms of preferred embodiments thereof which fulfills each and every one of the objects of the present invention as set forth above and provides a new and improved brake cooling system and method of cooling brakes.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. In a trailer having an un-powered axle assembly supporting rear wheels thereof, the axle assembly including brake assemblies for the wheels, the improvement comprising a cooling system for brakes in the un-powered axle assembly, the cooling system including:
   a) an air-oil cooler assembly;
   b) at least one hydraulic pump, an output of the pump in communication with an inlet of the air-oil cooler assembly, at least a portion of the oil exiting an outlet of the air-oil cooler assembly adapted to cool the brakes of the un-powered axle assembly;
   c) a hydraulic fan assembly adapted to circulate air past the air-oil cooler assembly, a fan of the fan assembly being driven by oil exiting the outlet of the air-oil cooler assembly;
   d) a reservoir for receiving oil from the hydraulic fan and the brakes and for further recirculation to an inlet of the at least one hydraulic pump;
   e) a transmission linked to the un-powered axle assembly, mounted between the brake assemblies and being equipped with a plurality of gears; and
   f) a pump drive linked to the transmission, output of the transmission driving the at least one hydraulic pump.

2. The system of claim 1, wherein the hydraulic fan assembly includes a control valve downstream of the air-oil assembly to receive a portion of the oil exiting an outlet of the air-oil cooler assembly, the valve adapted to control the flow of oil to the hydraulic fan assembly for fan operation.

3. The system of claim 1, wherein the pump drive is linked to the transmission via an electric clutch, the electric clutch controlling driving of the pump drive by the transmission based on the direction of rotation of a shaft of the axle assembly.

4. The system of claim 3, wherein the electric clutch receives a signal from back-up lights of a trailer to disengage the transmission from the pump drive.

5. The system of claim 1, wherein the transmission operation is directly controlled electronically for driving the pump.

6. The system of claim 1, further comprising a temperature regulated bypass valve in communication with an outlet of the air-oil cooler assembly, the bypass valve controlling flow of oil to the hydraulic fan assembly based on a sensed temperature of the oil.

7. The system of claim 1, further comprising a divider downstream of the air-oil cooler assembly, the divider directing oil to the brakes of the un-powered axle assembly and the hydraulic fan assembly.

8. The system of claim 1, further comprising a manifold collector adapted to receive oil from the brakes, hydraulic fan assembly for return to the reservoir.

9. The system of claim 1, wherein a pair of hydraulic piston pumps are used, and the output of the pumps is split to a pair of brake cooling inlets on the un-powered axle assembly.

10. A method of cooling brakes in an axle assembly comprising:
   a) providing a trailer having an un-powered axle assembly with at least one hydraulic pump mounted externally of brake assemblies contained in the un-powered axle assembly, and driving the at least one hydraulic pump using a rotation of a geared transmission mounted to the un-powered axle assembly and between the brake assemblies;
   b) directing oil exiting the at least one hydraulic pump to an air-oil cooler assembly to reduce the temperature of the oil;
   c) directing at least a portion of the oil exiting the air-oil cooler assembly to brakes of the un-powered axle assembly; and directing another portion of the oil exiting the air cooler assembly to a hydraulic fan assembly to drive a hydraulic fan thereof and circulate air across the air-oil cooler assembly; and
   d) accumulating the oil exiting the brakes and hydraulic fan assembly in a reservoir for recirculation to the at least one hydraulic pump.

11. The method of claim 10, wherein the pump is driven by a transmission linked to the un-powered axle assembly.

12. The method of claim 11, wherein the transmission is deactivated when the shaft is to rotate in a direction opposite of the direction of rotation that drives the pump.

13. The method of claim 10, further comprising sensing a temperature of the oil being pumped, and directing the another portion of the oil exiting the air cooler assembly to the hydraulic fan assembly to drive the hydraulic fan thereof to circulate air across the air-oil cooler assembly when the temperature reaches a certain target temperature.

14. The method of claim 11, wherein the pump is directly linked to the transmission, or is linked by an electrical or mechanical clutch.

15. The trailer of claim 1, wherein the hydraulic pump is mounted externally of the brake assemblies of the un-powered axle assembly.

16. The trailer of claim 1, wherein the trailer is a lowboy trailer having a front end hitch capable of connecting to a removable gooseneck hitch of a towing vehicle.

17. A braking cooling assembly comprising an un-powered axle assembly, a transmission for the un-powered axle assembly, and a cooling system, the cooling system further comprising:
   a) an air-oil cooler assembly;
   b) at least one hydraulic pump, an output of the pump in communication with an inlet of the air-oil cooler assembly, at least a portion of the oil exiting an outlet of the air-oil cooler assembly adapted to cool the brakes of the un-powered axle assembly;
   c) a hydraulic fan assembly adapted to circulate air past the air-oil cooler assembly, a fan of the fan assembly being driven by oil exiting the outlet of the air-oil cooler assembly;
   d) a reservoir for receiving oil from the hydraulic fan and the brakes and for further recirculation to an inlet of the at least one hydraulic pump;
   e) a transmission linked to the un-powered axle assembly, mounted between the brake assemblies and being equipped with a plurality of gears; and
   f) a pump drive linked to a transmission of the un-powered axle assembly, output of the transmission driving the at least one hydraulic pump.

18. The assembly of claim 1, wherein at least one un-powered axle assembly/transmission is mounted on a rear end of the trailer.

19. In a trailer having an un-powered axle assembly, the un-powered axle assembly having brakes that require cooling, the improvement comprising at least one hydraulic pump that supplies cooling oil to the brakes mounted externally to the brakes and means for driving of the hydraulic pump using rotation of a transmission mounted to the un-powered axle assembly and between the brakes thereof, means for disengaging the transmission from the un-powered axle assembly, and a heat exchanger assembly adapted to receive heated oil from the brakes for cooling and recirculation back to the brakes.

20. The assembly of claim 17, wherein the hydraulic pump is mounted externally of brake assemblies of the un-powered axle assembly.

* * * * *